United States Patent [19]

Hahn

[11] 3,936,411

[45] Feb. 3, 1976

[54] CROSSLINKED POLYVINYL CHLORIDE FILM

[75] Inventor: Ernest A. Hahn, Plainfield, Ill.

[73] Assignee: PPG Industries, Inc., Pittsburgh, Pa.

[22] Filed: Oct. 15, 1973

[21] Appl. No.: 406,403

Related U.S. Application Data

[63] Continuation-in-part of Ser. No. 211,640, Dec. 23, 1971, abandoned.

[52] U.S. Cl. ......... 260/32.6 R; 427/44; 260/30.4 R; 260/31.6; 260/32.8 R; 260/486 R; 260/884
[51] Int. Cl.... C08f 15/08; C08f 45/44; C07c 69/54
[58] Field of Search ...... 260/884, 885, 31.6, 475 N, 260/32.6 R, 486 R

[56] References Cited
UNITED STATES PATENTS

| | | | |
|---|---|---|---|
| 2,384,119 | 9/1945 | Muskat | 260/475 N |
| 2,758,104 | 8/1956 | Adelman | 260/32.6 R |
| 3,247,289 | 4/1966 | Sears | 260/884 |
| 3,336,361 | 8/1967 | Dill | 260/31.6 |
| 3,336,418 | 8/1967 | Dill | 260/884 |

*Primary Examiner*—Joseph L. Schofer
*Assistant Examiner*— Michl
*Attorney, Agent, or Firm*—George D. Morris

[57] ABSTRACT

Coating compositions comprising polyvinyl chloride are prepared by mixing a solution of polyvinyl chloride in an active solvent with an acrylic mixture and subjecting the mixture to ionizing irradiation. The cured films are hard, stain-resistant, heat-resistant, and mar-resistant.

4 Claims, No Drawings

CROSSLINKED POLYVINYL CHLORIDE FILM

CROSS-REFERENCE TO RELATED APPLICATION

This application is a continuation-in-part of application Ser. No. 211,640, filed Dec. 23, 1971 now abandoned.

Polymers of vinyl chloride have been used extensively in coating compositions and the coatings possess outstanding durability and flexibility. Generally, however, the films of these polymers are difficult and expensive to apply and, as they are thermoplastic, lack the strength of some of the crosslinked films formed from thermosetting resins.

The polyvinyl chloride films are generally applied as coatings or formed into films by either forming a plastisol of the material with a plasticizer and subjecting the polymer to high temperatures or by forming an organisol. The organisol is formed by adding an active solvent for the polyvinyl chloride. As application viscosities are necessarily low, an abundance of solvents must be used to cut down the solids content. Also, as active solvents with respect to the polyvinyl chloride are quite expensive, solvents which are not active with respect to the polymers, but which are less expensive, are generally added to the solution to cut down the solids content. The organisol, then, is originally a dispersion of polymer in active and non-active solvent. The non-active solvent has a lower boiling point than the active solvent so that the dispersion is applied to a substrate, flashed to a temperature higher than the non-active solvent boiling point and lower than that of the active solvent, thus forming an organisol of polymer in active solvent on the substrate to be coated. This application process requires a baking oven and a great deal of solvents. The plastisol requires a plasticizer and the use of very high temperatures. Thus, both of these processea are expensive and result in thermoplastic films and coatings which are not crosslinked.

It has now been discovered that outstanding films and coating compositions are obtained by combining solutions of polyvinyl chloride in active solvents with certain acrylic monomers. The coating compositions may then be subjected to ionizing irradiation to form thermosetting crosslinked coatings and films. Coatings formed from the compositions of this invention possess excellent appearance, impact-resistance, mar-resistance, stain-resistance, and are flexible.

The uses of the composition are many and varied due to the numerous excellent qualities of the resulting coatings. For example, they can be used as interior coatings for drums, pipes, and the like, as well as exterior finishes on metal surfaces such as aluminum or galvanized steel siding. They can also be used as table top coatings, refrigerator interior coatings and as coatings for many other articles.

The composition used to form the coating comprises (a) a solution of vinyl chloride polymer in a solvent for the polymer, and (b) a specific type of acrylic monomer.

The vinyl chloride polymer is a polymer containing at least about 90 percent by weight of polyvinyl chloride and preferably is the homopolymer of vinyl chloride. Suitable copolymers will include vinyl chloride-vinyl acetate, vinyl chloride-vinylidene chloride and the like.

The vinyl chloride polymer is put into solution with an active solvent for the polymer. Examples of active solvents for polyvinyl chloride are dimethylacetamide, tetrahydrofuran, morpholine, benzaldehyde, cyclohexanone, and the like. The solution should comprise from about 10 percent to about 30 percent by weight of vinyl chloride polymer. Generally it is preferred to use a solution of about 20 percent by weight of the vinyl chloride polymer with the remainder being a solvent such as dimethylacetamide.

The above solution is then combined with an acrylic mixture. The acrylic mixture is described in copending application Ser. No. 841,152 filed July 11, 1969, now abandoned.

The acrylic mixture is a mixture of acrylic hexahydrophthalate compounds having the formula:

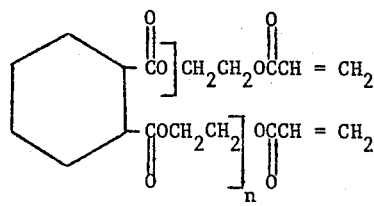

wherein $n = 0, 1, 2, 3, 4, 5, 6, 7, 8, 9$, and 10 and perhaps trace amounts of compounds having values of $n$ greater than 10. Relative amounts of each component may be estimated by graphical resolution of the gel phase chromatography curve of the reaction mixture, but the process is made difficult by differing refractive indices of the components of the mixture and by the overlapping of the peaks in the GPC curve due to inadequate resolution. However, it is believed that the mixture comprises from about 1 percent to about 20 percent by weight of the compound where $n = 1$, from about 5 percent to about 12 percent by weight of the compound where $n = 0$, from about 15 percent to about 25 percent by weight of the compound where $n = 2$ and from about 15 percent to about 25 percent by weight of the compound where $n = 3$, and from about 40 percent to about 55 percent by weight of compounds where $n = 4$ to 10. There are trace amounts of compounds present where $n$ is greater than 10.

Methods of forming the acrylic mixtures are described in copending application Ser. No. 841,152 filed July 11, 1969.

The acrylic monomers may be mixed with the solution of the polymer in any manner.

The coating composition comprises at least about 20 percent by weight of the solution of vinyl chloride polymer and from about 5 to about 80 percent by weight of the acrylic monomer. Normally only small amounts of the acrylic mixture need be added to the solution of vinyl chloride polymer to achieve the desired composition. The preferred coating composition comprises 16 percent by weight of the acrylic monomer mixture with the remainder being the solution of vinyl chloride polymer.

The coating compositions may also include various plasticizers, fillers, additives, and the like. The coatings may be formed by applying the composition onto a substrate by any conventional coating means such as roller coating, curtain coating, brushing, spraying, etc.

The coating compositions may be applied to any substrate such as wood, metal, plastic, etc. The coating is then dried either by air drying or baking in an oven at low temperatures.

The novel coating compositions of this invention are highly sensitive to ionizing irradiation and the coatings can be cured to hard, stain-resistant, mar-resistant, and weather-resistant films by subjecting them to ionizing irradiation.

The term "irradiation," as used herein, means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to product ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta–particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60

Various types of high power electron linear accelerators are commercially available, for example, the ARCO type travelling wave accelerator, model Mark I, operating at 3 to 10 million electron volts, such as supplied by High Voltage Engineering Corporation, Burlington, Massachusetts, or other types of accelerators as described in U.S. Pat. No. 2,763,609 and in British Pat. No. 762,953 are satisfactory for the practice of this invention.

The coatings will cure acceptably using any total dosage between about 0.2 megarad and about 50 megarads. A "rad" is defined as that amount of radiation required to supply 100 ergs per gram of material being treated and a "megarad" is $10^6$ rads. The total dosage is the total amount of irradiation received by the coating. The preferrable total dosage used is from about 0.5 megarad to about 1 megarads.

The following Example sets forth specific embodiments of the instant invention, however the invention is not to be construed as being limited to these embodiments for there are, of course, numerous possible variations and modifications. All parts and percentages in the Example as well as throughout the specification are by weight unless otherwise indicated.

EXAMPLE 1

A coating composition was formed by adding 15 parts of a mixture of acrylic hexahydrophthalate compounds having the formula:

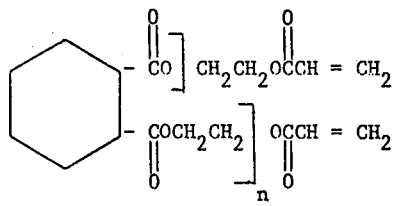

wherein $n = 0, 1, 2, 3, 4, 5, 6, 7, 8, 9$ and 10 to 25 parts of a 20 percent by weight solution of polyvinyl chloride (QYNV) in a 90 percent dimethylacetamide, 10 percent methyl ethyl ketone blend and mixing.

A glass substrate was coated with 3 mils of the above coating composition and air dried. The coating was then subjected to electron beam impingement at an accelerating potential of 400 kilovolts and a tube current of 14 milliamps. The coating received a total dosage of 5 megarads. The resulting coating was crosslinked and found to have excellent mar resistance and stain resistance.

The heat resistance of the above composition was further tested by irradiating with a total dosage of 5 megarads to form a film and taping the film on an aluminum panel and insertng in an oven at 600°f. for a short time. The film was unaffected by the heat resistance test. This was compared with films formed from polyvinyl fluoride with and without the acrylic mixture without irradiation and a film formed from polyvinyl chloride with the acrylic mixture but without irradiation. The latter three films decomposed when inserted in the oven at 600°F. and melted and turned brown.

According to the provisions of the patent statutes there is described above the invention and what are now considered to be its best embodiments. However, within the scope of the appended claims, it is to be understood that the invention can be practiced otherwise than as specifically described.

I claim:
1. A coating composition curable by ionizing irradiation consisting essentially of
   a. at least about 20 percent by weight of a solution of a chloride polymer in an active solvent for said polymer, wherein

(1) said polymer contains at least about 90 percent by weight of chloride, and
(2) said solution comprises from about 10 percent to about 30 percent by weight of said polymer and
b. from about 5 percent to about 80 percent by weight of a mixture of acrylic hexahydrophthlate compounds wherein
(1) each of said acrylic hexahydrophthalate compounds has the formula

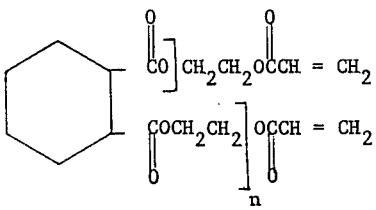

wherein $n$ is 0, 1, 2, 3, 4, 5, 6, 7, 8, 9 and 10, and (2) said mixture contains said acrylic hexahydrophthalate compounds having said formula wherein $n$ is 0, 1, 2, 3, 4, 5, 6, 7, 8, 9 and 10.

2. The coating composition of claim 1 wherein said vinyl chloride polymer is the homopolymer of vinyl chloride.

3. The coating composition of claim 1 wherein the mixture of acrylic hexahydrophthalate compounds comprises from about one percent to about 20 percent by weight of compounds having the formula wherein $n = 1$; about 5 percent to about 12 percent by weight of compounds having the formula wherein $n = 0$; about 15 percent to about 25 percent by weight of compounds having the formula wherein $n = 2$; and about 15 percent to about 25 percent by weight of compounds having the formula wherein $n = 3$, and about 40 percent to about 55 percent by weight of compounds having the formula wherein n is from 4 to 10.

4. The coating composition of claim 1 wherein the active solvent is dimethylacetamide.

* * * * *

UNITED STATES PATENT OFFICE
CERTIFICATE OF CORRECTION

PATENT NO. : 3,936,411

DATED : February 3, 1976

INVENTOR(S) : Ernest A. Hahn

It is certified that error appears in the above-identified patent and that said Letters Patent are hereby corrected as shown below:

Column 4, line 67, insert --vinyl-- before "chloride".

Column 5, line 2, insert --vinyl-- before "chloride".

Signed and Sealed this fourth Day of May 1976

[SEAL]

Attest:

RUTH C. MASON
Attesting Officer

C. MARSHALL DANN
Commissioner of Patents and Trademarks